United States Patent [19]

Blount

[11] Patent Number: 4,737,525

[45] Date of Patent: Apr. 12, 1988

[54] PROCESS FOR THE PRODUCTION OF THIXOTHROPIC SILICATES AND STABLE ORGANIC-SILICATE EMULSIONS

[76] Inventor: David H. Blount, 6728 Del Cerro Blvd., San Diego, Calif. 92120

[21] Appl. No.: 441

[22] Filed: Jan. 5, 1987

[51] Int. Cl.$^4$ .............................................. C08J 9/00
[52] U.S. Cl. .................................. 521/122; 423/326; 423/325; 106/308 B; 106/308 M; 106/286.2; 106/286.3; 106/286.4; 106/286.5; 106/286.6; 106/287.34; 524/443; 524/444; 524/449; 524/451; 528/44
[58] Field of Search ............................... 423/325, 326; 106/208 B, 308 M, 286.2, 286.3, 286.4, 286.5, 286.6, 287.34; 524/451, 449, 443, 444; 528/44; 522/122

[56] References Cited

U.S. PATENT DOCUMENTS 4,325,859  4/1982  Blount .................................. 524/251
4,332,926  6/1982  Blount .................................... 528/49

Primary Examiner—Marquis Melvyn I.

[57] ABSTRACT

Thixotropic silicates and stable emulsions are produced by reacting a salt-forming compound such as mineral acids and a powdered natural silicate in a liquid organic compound. The thixotropic silicate such as minerals containing silicates may be utilized to produce stable organic compound-silicate emulsion, as an anti-sag material, as a filler and as a thickener. It may be further chemically reacted along with the organic compound to produce useful foams, resins, coating agents and fillers.

14 Claims, No Drawings

PROCESS FOR THE PRODUCTION OF THIXOTHROPIC SILICATES AND STABLE ORGANIC-SILICATE EMULSIONS

BACKGROUND OF THE INVENTION

This invention relates to the production of thixotropic silicates from natural silicates and, in the process, produces a stable organic compound-thixotropic silicate emulsion. The stable organic compound-silicate emulsions are produced by mixing and reacting a finely-powdered, natural silicate and a salt-forming compound, containing water in a liquid organic compound.

It is well known in the arts that a water-soluble alkali metal silicate may be reacted with an acid compound to produce a precipitated silica that, when dried, has thixotropic properties and will function as a thickening agent. The soluble alkali metal silicates are considerably more expensive than powdered natural silicates. When natural silicates are reacted with a salt-forming compound in an aqueous solution, the dried silicate has poor thixotropic properties. I have discovered that when the powdered natural silicates are reacted with a salt-forming compound containing water, in a liquid organic compound, it becomes a very good thixotropic agent. The thixotropic silicates are inexpensive and they also contain active oxide, hydroxyl and silicic acid radicals which can be reacted with organic compounds, silicon halide compounds and other inorganic compounds. An excess amount of the thixotropic silicate may be used as an inexpensive filler. When the powdered natural silicates are reacted with a salt-forming compound containing water without being in an organic liquid, the free hydroxyl and acid radicals react with each other to form clumps of natural silicates and require re-grinding to a fine powder. Most of the thickening properties are lost with the loss of the free oxide, hydroxyl and acid radicals.

The liquid organic compound may function only as a liquid medium for the reaction to take place in. After the reaction is completed, the liquid organic compound may be filtered off; then the remaining liquid may be evaporated off, thereby producing the thixotropic natural silicate with free oxide, hydroxyl and silicic acid radicals which, when added to liquid organic resins, e.g., polyols, polyesters, epoxy, phenoplast, aminoplasts, vinyl resins and paints, acts as a thickening agent, forming stable emulsions and stable sag-resistance emulsions.

Thixotropic natural silicates are produced by mixing and reacting the following components in an organic liquid:

A. finely-powdered natural silicate;
B. salt-forming compound;
C. water.

The process of this invention also produces a stable organicsilicate emulsion.

Any suitable liquid organic compound may be used in this invention. Suitable liquid organic compounds include aliphatic, cycloaliphatic, aromatic, heterocyclic and mixtures thereof. Any liquid organic compound which will react with the salt-forming compound before the salt-forming compound can react with the natural silicates are not suitable, e.g., many amine compounds. The organic compound may be both the liquid organic compound and the salt-forming compound, e.g., acetic acid, propanoic acid, chloroacetic acid, etc. The liquid organic compounds may be saturated or unsaturated and may be substituted, e.g., with halogen, nitro radical, sulfates, etc.

Component A

Any suitable natural silicate may be utilized in this process, but natural salts of silicic acid or polysilicic acid that occur in nature as minerals are preferred. There are many types of natural silicates such as salts of orthosilicic acid, e.g., mica, willemite, zircon, forsterite, pyrope, andalusite, etc., such as salts of metasilic acid, e.g., chrysocolla, wollastonite, talc, asbestos, etc., orthoclase, natrolite, albite, etc., or mixtures thereof, which may be used in this invention.

The natural silicates which are readily available commercially in the form of fine powders are preferred, e.g., talc, clay, mica, etc.

Component B

Any suitable salt-forming compound may be utilized in this invention. Suitable salt-forming compounds include, but are not limited to, inorganic acids, organic acid, acid anhydrides, polyfunctional alkylating agents, e.g., 1,4-dibromobutane, p-xylylenedichloride, etc. Suitable alkylating agents may be found in Dutch Auslegischrift No. 67/03743. Further examples of suitable acids may be found in German Pat. No. 1,178,583 and U.S. Pat. No. 3,480,592.

Suitable inorganic acid includes hydrochloric acid, sulfuric acid, phosphoric acid, nitric acid and hydrogen salt of mineral acids. The preferred salt-forming compound is a mineral acid.

Suitable organic acids include, but are not limited to, aliphatic carboxylic acids, aliphatic acid, anhydrides, aliphatic polycarboxylic acids, cycloaliphatic carboxylic acids, cycloaliphatic polycarboxylic acids, aromatic carboxylic acid, aromatic polycarboxylic acids, and mixtures thereof. The organic acids may be substituted, a.g., with halogen atoms, and may be unsaturated.

Component C

Water is necessary to produce the free hydroxyl and silicic acid radicals on the natural silicate molecule. Only enough water to react with silicate molecule, which has reacted with the salt-forming compound, is needed. Excess water is not desired. The amount of water present in concentrated mineral acids is sufficient.

SUMMARY OF THE INVENTION

The preferred method to produce a stable organic compoundthixotropic silicate emulsion is to mix the finely-powdered natural silicate and the organic compound, then add the salt-forming compound containing water while agitating until the chemical reaction is complete, thereby producing a stable, thickened emulsion.

The components may be mixed in any suitable method, such as simultaneously or by mixing two components first in the organic liquid, then adding the third component while agitating the mixture at ambient temperature and pressure until the reaction is complete. It is preferred not to mix the natural silicate and salt-forming compound first because the reaction should take place in an organic liquid. When it is desirable to recover the reacted natural silicate, the organic compound may be filtered off, then the remaining fluid evaporated.

The components may be mixed in any suitable proportions, the preferred proportions being 1 to 50 parts by weight of the natural silicate, 25 parts by weight of the organic compound, 0.1 to 10 parts by weight of a salt-forming compound and 0.1 to 10 parts by weight of water. When the thixotropic natural silicate is to be recovered from the organic-silicate emulsion, an excess amount of the liquid organic compound may be used.

Other components may be added to the mixture of this invention. The components added will depend on the end use of the emulsion. When the emulsion is a polyol-natural silicate emulsion, it is desirable to add surface-active additives such as emulsifiers and foam stabilizer in an amount up to 10% by weight of each, based on the weight of all components of the mixture. Suitable emulsifiers are, e.g., the sodium salts of recinoleic sulphonates or of fatty acids or salts of fatty acids with amine, alkali metal or ammonium salts of sulphonic acid such as dodecylbenzene sulphonic acid or dinaphthyl methane disulphonic acid, etc. The foam stabilizers used are mainly water-soluble polyester siloxanes such as the kind described in U.S. Pat. No. 3,629,308.

Suitable flame-resistant compounds may be used when desired in the products of this invention such as those which contain halogen, phosphorus or mixtures thereof. Useful flame-resistant compounds are described in Kusiststoff-Handbuch, Volume VII, Munich, 1966, pages 110 and 111, which are incorporated herein by reference.

In the production of foamed product using the stable organic silicate emulsion, blowing agent may be added to the emulsion. Suitable blowing agents that boil between $-20°$ C. and $80°$ C. such as acetone, ethyl acetate, methanol, ethanol, halogenated alkanes, butane, hexane, diethyl ether, compounds that decompose at a temperature above room temperature with liberation of a gas, compressed gases, e.g., air, $CO_2$, nitrogen, etc., may be used in this invention. Up to 50% by weight of the blowing agent, based on weight of all components, may be used in this invention.

In the production of polyurethane silicate foamed products, activators (catalysts) which act as curing agents, e.g., tertiary amines, organo-metallic compounds and other examples of catalysts, may be used according to the invention. Details of their action are described in Kunststoff-Handbuch, Carl-Hanser-Verlag, Munich, 1966, e.g., on pages 96 and 102. These may be used in the amount up to 10%, percentage based on weight of all reactants.

In the production of stable emulsion of finely-powdered natural silicates and liquid organic compounds, e.g., polyols, epoxy resins, polyester resins, vinyl monomers, vinyl resins, paints, varnishes, etc., the finely-powdered natural silicate, salt-forming compound and water are reacted in the desired organic compound, thereby producing a stable emulsion. The reacted natural silicate is utilized as the thixotropic agent, as the anti-sag agent, as the filler; also it may be a reactant in future chemical reactions and it reduces the cost of the final product. It is not necessary to react the salt-forming compound with all the molecules of the natural silicate—only a sufficient amount to produce the desired thixotropic effect—and the unreacted molecules act as filler. It is usually not necessary to remove the salt formed in the reaction.

When it is desirable to use the thixotropic agent of this invention in organic compounds which will react with the salt-forming compound such as amine compound, e.g., ethyl amine, diethylenetriamine, etc., it is necessary to produce the thixotropic natural silicate in another organic compound, e.g., methylene chloride, dichloroethylene, ketone, gasoline, etc., then evaporate off the organic compound and add the thixotropic natural silicate to the amine compound. If desired, the salt may be removed from the silicate by washing with water, filtering off the water, then drying the silicate before adding to the amine compound. In many cases, the salt, especially when phosphoric acid is used, acts as a flame retardant and is a desirable component of the emulsion.

The polyol-thixotropic natural silicate emulsion may be utilized in the production of polyurethanes, polyester resins and epoxy resins. In the production of polyurethane silicate products, the polyol-natural silicate emulsion will react with compounds which contain at least two isocyanate radicals. Polyurethane silicate products may also be produced, utilizing organic compound-silicate emulsion wherein the compound contains at least two hydrogen atoms that will react with polyisocyanate compounds. Compounds which contain only one active hydrogen atom may be used with compounds that contain at least two hydrogen atoms that will react with the polyisocyanate. Any suitable polyisocyanate known in the arts may be utilized to react with suitable organic compound-silicate emulsion.

The polyol-silicate emulsion may be utilized in the production of polyester resin. The polyol-silicate emulsion is reacted with polycarboxylic acid and anhydrides to produce polyester-silicate products. The polyol-silicate emulsion may be utilized in the production of epoxy-silicate product by reacting with an epihalohydrin in the presence of an alkali metal hydroxide.

Suitable compounds containing at least two isocyanate groups, including aliphatic, cycloaliphatic, araliphatic, aromatic and heterocycle polyisocyanates, and mixtures thereof, may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention. The organic-silicate emulsion, wherein the organic compound contains at least two hydrogen atoms that will react with isocyanate groups and in an amount of 1 to 100 parts by weight, will react with 25 to 100 parts by weight of a compound containing at least two isocyanate groups to produce polyurethane silicate products. The polyisocyanate also reacts with the free hydroxyl and silicic acid group of the reacted natural silicates to produce polyisocyanate silicate products.

In the production of polyurethane foams, the powdered natural silicates which have not been chemically changed interfere with the production of uniform foam cells and cause the foam to fall before it cures, or the silicates produce a very irregular cellular structure in the foam. The process in this invention prevents this problem and a fine, uniform cell structure is produced in the foam.

Many additives may be added to the organic thixotropic silicate and polyisocyanate mixture such as fillers, water-binding agents, reinforcement elements, plasticizers, dyes, fungicidal and bacteriocidal substances, organic extenders, etc.

The polyurethane silicate forms may be utilized as thermal and sound insulation; as cavity fillers; as lightweight building panels; as molded art objects; as coating agents; as flotation material; for cushioning material in furniture, cars, etc.; as packaging material and for many other uses.

The proportions of the reactants and other compounds used in this invention may vary within the following ratio: The percentage is based on weight of all the components of the mixture:
(a) 1 to 50 parts by weight of natural silicate;
(b) 25 parts by weight of liquid organic compound;
(c) 0.1 to 10 parts by weight of a salt-forming compound;
(d) 0.1 to 10 parts by weight of water;
(e) up to 10% by weight of an emulsifier;
(f) up to 10% by weight of a foam stabilizer;
(g) up to 50% by weight of a blowing agent;
(h) up to 10% by weight of an initiator.

The object of the present invention is to provide a novel process for the production of thixotropic natural silicates. Another object is to provide a process to produce novel inexpensive thixotropic natural silicates and, in the same process, produce stable organic-silicate emulsions. Another object is to produce inexpensive thixotropic natural silicate which also contains free oxide, hydroxyl and silicic acid radicals that may be utilized in the production of useful foams, coating agents, adhesives and plastic formed and molded products.

DESCRIPTION OF PREFERRED EMBODIMENTS

My invention will be illustrated in greater detail in the specific Examples which follow, which detail the preferred embodiments of my process. It should be understood that the scope of my invention is not limited to the specific processes set out in the Examples. Parts and percentages are by weight, unless otherwise indicated.

EXAMPLE 1

About 50 parts by weight of finely-powdered talc and 50 parts by weight of methylene chloride are mixed, then 5 parts by weight of concentrated sulfuric acid are slowly added, while agitating. A gas is released from the reaction mixture and the mixture thickens. Most of the reaction takes place in a few minutes, but some reaction continues for 1 to 2 hours, thereby producing a thixotropic silicate. The emulsion is then filtered to remove some methylene chloride and that remaining is removed by air drying. The methylene chloride is recovered for re-use. The reacted natural silicate is washed with water, filtered to remove water and salt, then air-dried.

EXAMPLE 2

Example 1 is modified wherein another salt-forming compound is used in place of sulfuric acid and is selected from the list below:
(a) concentrated phosphoric acid;
(b) concentrated hydrochloric acid;
(c) concentrated nitric acid;
(d) aqueous solution containing 50% by weight of the sodium hydrogen sulfate;
(e) acetic acid containing 50% water;
(f) chloroacetic acid containing 50% water;
(g) aqueous solution containing 50% adipic acid;
(h) aqueous solution containing 50% oxalic acid;
(i) propionic acid containing 50% water;
(j) aqueous solution containing 50% fumaric acid;
(k) mixtures of the above.

EXAMPLE 3

Example 1 is modified wherein another organic chemical is used in place of methylene chloride and is selected from the list below:
(a) ethylene dichloride;
(b) trichloromonofluoromethane;
(c) 1,1,1-trichloroethane;
(d) acetone;
(e) gasoline;
(f) acetic acid;
(g) methanol;
(h) ethanol;
(i) nitroethane;
(j) mineral spirits;
(k) allyl chloride;
(l) mixtures thereof.

EXAMPLE 4

Example 1 is modified wherein another finely-powdered natural silicate is used in place of talc and is selected from the list below:
(a) clay;
(b) mica:
(c) Kaolin;
(d) asbestos;
(e) Wollastomite (calcium silicate);
(f) natural zeolite;
(g) mixtures of the above.

EXMAPLE 5

About 100 parts by weight of a polyol, selected from the list below, and 100 parts by weight of fine-powdered talc are mixed, then 15 parts by weight of an aqueous solution containing 50% phosphoric acid are added while agitating. A gas is released by the reaction and the reaction is complete in 1 to 2 hours, thereby producing a stable polyol-thixotropic natural silicate emulsion.
(a) ethylene glycol;
(b) propylene glycol;
(c) butylene glycol;
(d) hexane-1,5-diol;
(e) glycerol;
(f) trimethylol propane;
(g) pentaerythritol;
(h) diethylene glycol;
(i) triethylene glycol;
(j) tetraethylene glycol;
(k) polyethylene glycol;
(l) polypropylene glycol;
(m) dipropylene glycol;
(n) dibutylene glycol;
(o) polybutylene glycol;
(p) aromatic polyester polyol;
(q) polyester polyol (0.5 mol. of adipic acid and 4 mol. glycerol);
(r) castor oil;
(s) amine sucrose polyether polyol (Hydroxyl No. 350);
(t) propylene polyether triol (Hydroxyl No. 56);
(u) propylene polyether triol capped with ethylene glycol (Hydroxyl No. 57);
(v) liquid formaldehyde phenol resin with free hydroxyl groups;
(w) ethylene-propylene polyether diol (Hydroxy No. 36).

EXAMPLE 6

About 50 parts by weight of Kaolin and 100 parts by weight of a liquid polyester resin, selected from the list below, are mixed, then 15 parts by weight of acetic acid containing 25% water are added while agitating. The reaction is complete in 1 to 2 hours, thereby producing a stable polyester resin-natural silicate emulsion.
  (a) maleic anhydride-diethylene glycol-styrene polyester resin;
  (b) fumaric acid-propylene glycol-styrene polyester resin;
  (c) maleic anhydride-phthalic anhydride-ethylene glycol-vinyl acetate polyester resin;
  (d) maleic anhydride-adipic acid-diethylene glycol-methyl methacrylate polyester resin.

EXAMPLE 7

About 100 parts by weight of finely-powdered talc and 100 parts by weight of a polyepoxy resin, selected from the list below, are mixed, then 15 parts by weight of an aqueous solution containing 50% phosphoric acid are added while agitating. A gas is released, probably oxygen, and the reaction is complete in 1 to 2 hours, thereby producing a stable polyepoxy-silicate emulsion.
  (a) Bisphenol A epoxy resin;
  (b) phenol novalac epoxy resin;
  (c) triphenylolmethane epoxy resin;
  (d) polypropylene glycol epoxy resin;
  (e) methylene dianiline epoxy resin;
  (f) P-amino phenol epoxy resin;
  (g) dimer acid epoxy resin;
  (h) mixtures thereof.

EXAMPLE 8

About 10 parts by weight of the thixotropic natural silicate produced in Example 1 and 10 parts by weight of a liquid organic compound, selected from the list below, are mixed, thereby producing a stable emulsion.
  (a) propylene triol (mol. wt. 3000, Hydroxyl No. 56);
  (b) Bisphenol A epoxy resin;
  (c) polyester polyol;
  (d) maleic anhydride diethylene glycol-styrene polyester resin;
  (e) castor oil;
  (f) linseed oil;
  (g) diphenol methane 4,4'-disocyanate;
  (h) toluene diisocyanate (TDI);
  (i) polyepichlorohydrin;
  (j) propylene glycol;
  (k) aromatic polyester polyol;
  (l) liquid formaldehyde phenol resin;
  (m) varnish;
  (n) Polyester enamel;
  (o) diethylenetriamine;
  (p) diethylenetriamine-fatty acid condensation product;
  (q) aqueous polyvinyl acetate emulsion;
  (r) rubber latex;
  (s) methyl methylate polymer in methyl;
  (t) methylate monomer;
  (u) vinyl polymer in an organic solvent;
  (v) vinyl polymer in an aqueous suspension.

EXAMPLE 9

About 100 parts by weight of a polyisocyanate selected from the list below and 100 parts by weight of finely-powdered talc are mixed, then 15 parts by weight of phosphoric acid, containing 50% water, are added. With agitating, a gas is released and the reaction is completed in 1 to 2 hours, thereby producing foamed polyisocyanate silicate products.
  (a) crude MDI;
  (b) methylene-di-p-phenylene diisocyanate;
  (c) toluene diisocyanate ("TDI");
  (d) polyphenyl-polymethylene-isocyanates obtained by aniline-formaldehyde condensation followed by phosgenation ("PAPI 27" produced by Upjohn);
  (e) p,p-diphenylmethane diisocyanate;
  (f) hexamethylene diisocyanate;
  (g) naphthylene diisocyanate;
  (h) Polymeric MDI ("MONDUR MR" produced by Mobay);
  (i) Polymeric MDI reacted with polyethylene glycol to produce a prepolymer with an NCO of about 30%.

EXAMPLE 10

Example 5 is modified when an additional step is taken wherein about 120 parts by weight of a polyisocyanate, listed below, 2 parts by weight of a polyester siloxane foam regulator, 0.25 parts by weight of triethylenediamine, 0.05 parts by weight of tin octoate and 5 parts by weight of trichloromonofluoromethane are mixed with the stable polyol-thixotropic natural silicate emulsion. The mixture slowly expands and cures into a self-standing polyurethane silicate foam.
  (a) toluene diisocyanate ("TDI");
  (b) polyphenyl-polymethylene-isocyanates obtained by aniline-formaldehyde condensation followed by phosgenation ("PAPI 27" produced by Upjohn);
  (c) Polymeric MDI ("MONDUR MR" produced by Mobay);
  (d) hexamethylene diisocyanate;
  (e) polyphenylisocyanate ("PAPI 135" produced by Upjohn;
  (f) diphenylmethane diisocyanate ("ISONATE 181" produced by Upjohn);
  (g) Polymeric MDI ("MONDUR MRS" produced by Mobay);
  (h) modified 4,4' diphenylmethane diisocyanate ("MONDUR CD" produced by Mobay)'
  (i) MDI/Polyester prepolymer ("MULTRATHANE E-410" produced by Mobay).

EXAMPLE 11

About 30 parts by weight of a polypropylene triol, hydroxyl No. 56, mol. wt. 3000, and 30 parts by weight of powdered talc are mixed, then 5 parts by weight of phosphoric acid, containing 50% water, are added while agitating. A gas is released. The reaction is complete in 1 to 2 hours, thereby producing a stable polypropylene triolthixotropic silicate emulsion; then 0.1 parts by weight of a silicone foam regulator ("DOW 190"), 0.2 parts by weight of triethylenediamine and 0.02 parts by weight of tin octoalate are added and mixed in the emulsion. About 12 parts by weight of toluene diisocyanate ("TDI" produced by Olin) are mixed with the emulsion and the mixture expands, to produce a strong, flexible polyurethane silicate foam containing a combination of open and closed cells which weighs about 1.2 pounds per cubic foot. The foam has very good cushioning properties.

EXAMPLE 12

About 30 parts by weight of a sucrose amine polyol, hydroxyl No. 357, and 30 parts by weight of a finely-powdered talc are mixed, then 5 parts by weight of phosphoric acid, containing 50% water, are added while agitating. A gas is released. The reaction is complete in 1 to 2 hours, thereby producing a stable sucrose amine polyol-thisotropic silicate emulsion. About 0.5 parts by weight of a silicone foam regulator ("DOW 193") and 0.04 parts by weight of tin octoate are mixed in the emulsion. About 20 parts by weight of polymeric MDI ("MONDUR MR" produced by Mobay) and 3 parts by weight of trichloromonofluoromethane are mixed with the emulsion. The mixture slowly expands to a rigid polyurethane silicate foam which contains mainly closed cells and has a weight of about 2 pounds per cubic foot. This foam has very good thermal and sound-insulation properties.

EXAMPLE 13

About 25 parts by weight of powdered clay and 100 parts by weight of an organic polymer, selected from the list below, are mixed, then 4 parts by weight of concentrated hydrochloric acid are added while agitating. The reaction is complete in 1 to 2 hours, thereby producing a stable organic polymer-thixotropic silicate emulsion.

(a) poly(methyl methacrylate) polymer in methyl methacrylate monomer;
(b) polystyrene polymer in an organic solvent;
(c) polystyrene polymer in an aqueous emulsion;
(d) poly(vinylactate) polymer in an organic solvent;
(e) poly(vinylactate) polymer in an aqueous emulsion;
(f) poly(methacrylic acid) polymer in an aqueous emulsion;
(g) Polyvinyl chloride in an aqueous emulsion;
(h) Poly(vinyl chloride) polymer in an organic solvent;
(i) polyisoprene polymer in an aqueous emulsion;
(j) liquid polysulified polymer;
(k) liquid poly(furyl alcohol) polymer;
(l) methyl vinyl ketone polymer in an aqueous solution;
(m) polyacrylonitrile in an aqueous emulsion;
(n) butadiene-styrene copolymers in an aqueous emulsion;
(o) poly(methly styrene) polymer (liquid).

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto so as to enhance or otherwise modify the reaction and products.

Other modifications of my invention will occur to those skilled in the art upon reading my disclosure. Those are intended to be included within the scope of my invention, as defined in the appended claims.

I claim:

1. The process for the production of thixotropic silicates which consist of mixing and reacting the following components in a liquid organic compound which is selected form the group consisting of aliphatic, cycloaliphatic, aromatic and heterocyclic compounds and mixtures thereof:

Component A: finely powdered natural silicates selected from the group consisting of talc, mica, wollastonite, clay, zircon, asbestos, forsterite, pyrope, natrolite, chrystocolla, orthoclase, albite, willemite, andalusite, kaolin, natural zeolite or mixtures thereof, in the amount of 1 to 50 parts by weight;

Component B: salt-forming compound selected from the group consisting of inorganic acids, organic acids, organic anhydrides, hydrogen salts of mineral acids and mixtures thereof, in the amount of 0.1 to 10 parts by weight.

Component C: water, in the amount of 0.1 to 10 parts by weight.

2. The product, thixotropic silicate, produced by the process of claim 1.

3. The process of claim 1 wherein the organic compound is removed by filtration and evaporation after the reacting is complete and the thixotropic silicates are produced, then the salt is removed by washing with water and then the water and salt is filtered off, the thixotropic silicate is then air-dried.

4. The product produced by the process of claim 1 wherein the organic compound is a polyol, thereby producing a stable polyol-silicate emulsion.

5. The product produced by the process of claim 1 wherein the organic compound is a polyepoxy compound, thereby producing a stable polyepoxysilicate emulsion.

6. The product produced by the process of claim 1 wherein the organic compound is selected from the group consisting of a liquid polyester, polyester in an organic solvent, unsaturated polyester with vinyl monomer and mixtures thereof, thereby producing a stable polyester-silicate emulsion.

7. The product produced by the process of claim 1 wherein the organic compound is an organic compound containing at least two isocyanate radicals, thereby producing a foamed polyisocyanate-silicate product.

8. The product produced by the process of claim 1 wherein the liquid organic compound is selected from the group of polymers consisting of phenolplasts, aminoplasts, polyesters, polyamides, silicones, polyethers, thioplasts, furan resins, vinyl resins, rubber, allyl chloride, allyl alcohol, polyepoxy, polyol, dienes, vinyldiene, cyclic resins, and mixtures thereof, thereby producing a stable organic polymer-silicate emulsion.

9. The process of claim 1 wherein the liquid organic compounds are compounds containing at least two hydrogen atoms that will react with isocyanate radicals and in the amount of 1 to 100 parts by weight, a further step is taken after the chemical reactions are complete, wherein the thixotropic silicate in a liquid organic compound is mixed and reacted with 25 to 100 parts by weight of a compound containing at least two isocyanate groups, thereby producing a foamed polyurethane silicate product.

10. The product produced by the process of claim 9.

11. The process of claim 9 wherein the organic compounds containing at least two hydrogen atoms are polyols.

12. The process of claim 9 wherein the compound containing isocyanate groups is selected from the group consisting of aliphatic, cycloaliphatic, araliphatic, aromatic and heterocyclic polyisocyanates and mixtures thereof.

13. The process of claim 9 wherein up to 10% by weight of an initiator, percentage being based on the weight of all components, is selected from the group consisting of tertiary amine, silaamine, organic metal compounds and mixtures thereof, and added to the organic-silicate emulsion.

14. The process of claim 9 wherein up to 50% by weight of a blowing agent which boils between $-20°$ C. to $80°$ C., percentage based on weight of all components in the mixture, is added to the components of claim 9.

* * * * *